United States Patent
Kim

(10) Patent No.: US 12,001,205 B2
(45) Date of Patent: Jun. 4, 2024

(54) REMOTE CONTROL METHOD AND SYSTEM FOR ROBOT

(71) Applicant: NAVER LABS CORPORATION, Seongnam-si (KR)

(72) Inventor: Kahyeon Kim, Seongnam-si (KR)

(73) Assignee: NAVER LABS Corporation, Gyeonggi-do (KR)

(*) Notice: Subject to any disclaimer, the term of this patent is extended or adjusted under 35 U.S.C. 154(b) by 238 days.

(21) Appl. No.: 17/381,800

(22) Filed: Jul. 21, 2021

(65) Prior Publication Data

US 2022/0035370 A1 Feb. 3, 2022

(30) Foreign Application Priority Data

Jul. 29, 2020 (KR) ........................ 10-2020-0094178

(51) Int. Cl.
  *G05D 1/00* (2006.01)
  *G06F 3/14* (2006.01)

(52) U.S. Cl.
  CPC ......... *G05D 1/0044* (2013.01); *G05D 1/0022* (2013.01); *G05D 1/0038* (2013.01); *G06F 3/14* (2013.01)

(58) Field of Classification Search
  CPC .... G05D 1/0044; G05D 1/0016; G05D 1/101; G05D 1/0022; G05D 1/0038; G06F 3/14
  See application file for complete search history.

(56) References Cited

U.S. PATENT DOCUMENTS

2011/0054689 A1   3/2011   Nielsen et al.

FOREIGN PATENT DOCUMENTS

| JP | H11-149315 A | 6/1999 |
|----|----|----|
| JP | 2002-084531 A | 3/2002 |
| JP | 2007-221191 A | 8/2007 |
| JP | 2010-128799 A | 6/2010 |
| JP | 2014-016858 A | 1/2014 |
| JP | 2014-503376 A | 2/2014 |
| JP | 2017-003866 A | 1/2017 |
| JP | 2017-211893 A | 11/2017 |
| JP | 2019-077528 A | 5/2019 |
| JP | 6526613 B2 | 6/2019 |

(Continued)

OTHER PUBLICATIONS

WIPO translation of application for KR 20140048416 A (Year: 2012).*

(Continued)

*Primary Examiner* — Jason Holloway
*Assistant Examiner* — Christopher A Buksa
(74) *Attorney, Agent, or Firm* — Harness, Dickey & Pierce, P.L.C.

(57) ABSTRACT

A robot remote control method and system capable of remotely controlling navigation of a robot. The robot remote control method includes outputting both a map image and an ambient image to a display, the map image including location information corresponding to the ambient image, the ambient image being of surroundings of a robot, and the ambient image being received from a camera at the robot, generating a control command for controlling the robot in response to an input to the display during the outputting, and causing the robot to drive according to the control command by transmitting the control command to the robot.

20 Claims, 13 Drawing Sheets

(56) References Cited

FOREIGN PATENT DOCUMENTS

| KR | 10-2013-0027349 A  |   | 3/2013 |
| --- | --- | --- | --- |
| KR | 101305944 B1 |   | 9/2013 |
| KR | 20140048416 A | * | 4/2014 |
| KR | 101392679 B1 |   | 5/2014 |
| WO | WO-2012/091814 A2 |   | 7/2012 |
| WO | WO-2015/017691 A1 |   | 2/2015 |

OTHER PUBLICATIONS

Japanese Notice of Allowance dated Jan. 4, 2023 for corresponding JP Patent Application No. 2021-122299.
Extended European Search Report dated Nov. 12, 2021, corresponding to EP Application No. 21185386.6.
Office Action dated Jul. 26, 2022 issued in corresponding Japanese patent application No. 2021-122299.
Korean Office Action dated Aug. 27, 2021, for corresponding Korean Patent Application No. 10-2020-0094178.
Korean Notice of Allowance dated Sep. 8, 2021 for corresponding KR application No. 10-2021-0081911.

* cited by examiner

FIG. 11

| INPUT TYPE | INPUT FEATURE | DRIVING ATTRIBUTES |
|---|---|---|
| DRAG | LENGTH | MOVING DISTANCE |
| | SPEED | MOVING SPEED |
| | DIRECTION | MOVING DIRECTION |
| | LENGTH + SPEED | MOVING DISTANCE + MOVING SPEED |
| | LENGTH + DIRECTION | MOVING DISTANCE + MOVING DIRECTION |
| | SPEED + DIRECTION | MOVING SPEED + MOVING DIRECTION |
| CLICK | INTERVAL | MOVING DISTANCE |
| | NUMBER OF TIMES | MOVING SPEED |
| | LOCATION | MOVING DIRECTION |
| | INTERVAL + NUMBER OF TIMES | MOVING DISTANCE + MOVING SPEED |
| | INTERVAL + LOCATION | MOVING DISTANCE + MOVING DIRECTION |
| | NUMBER OF TIMES + LOCATION | MOVING SPEED + MOVING DIRECTION |

REMOTE CONTROL METHOD AND SYSTEM FOR ROBOT

CROSS-REFERENCE TO RELATED APPLICATION

Pursuant to 35 U.S.C. § 119(a), this application claims the benefit of earlier filing date and right of priority to Korean Application No. 10-2020-0094178, filed on Jul. 29, 2020, the contents of which is incorporated by reference herein in its entirety.

BACKGROUND

1. Technical Field

Some example embodiments relate to a control method and system for a robot, and particularly, to a control method and system for a robot capable of remotely controlling navigation of a robot.

2. Background

As technology advances, various service devices emerge, especially in recent years, technology development for robots that perform various tasks or services is actively ongoing.

Furthermore, recently, as artificial intelligence technologies and cloud technologies have evolved, the utilization of robots is gradually increased.

On the other hand, in order to provide various tasks or services with robots, it is important to control the robot accurately. However, the desire for techniques to remotely manage and control robots become important gradually, as there are realistic limitations for users to perform a control over robots one by one therearound.

For example, a technique is used to remotely manage and control a robot by providing cameras around the robot, acquiring images around the robot, and using the acquired images.

However, when the surroundings of the robot are identified only by the cameras provided at the robot, location information indicating where the robot is located may not be accurately identified. Therefore, a control system that may more intuitively provide location information and surrounding environment information of the robot would be desirable.

SUMMARY

Therefore, an aspect of the detailed description is to provide a remote control method and system for a robot. More specifically, some example embodiments provide a remote control method and system for a robot, capable of remotely controlling navigation of a robot more intuitively.

Furthermore, some example embodiments provide a remote control method and system for a robot, capable of remotely controlling a robot by considering surrounding environment of the robot and a current location of the robot.

In addition, some example embodiments provide a remote control method and system for a robot, capable of providing a user experience to intuitively control an interface for controlling a robot.

To achieve these and other advantages and in accordance with some example embodiments, as embodied and broadly described herein, there is provided a remote control method for a robot, including outputting both a map image and an ambient image to a display, the map image including location information corresponding to the ambient image, the ambient image being of surroundings of a robot, and the ambient image being received from a camera at the robot, generating a control command for controlling the robot in response to an input to the display during the outputting, and causing the robot to drive according to the control command by transmitting the control command to the robot.

To achieve these and other advantages and in accordance with some example embodiments, as embodied and broadly described herein, there is also provided a remote control system for a robot, including a display, a communication unit configured to receive an ambient image from a camera provided at a robot, the ambient image being of surroundings of the robot, and a controller configured to control the display to output both a map image and the ambient image, the map image including location information corresponding to the ambient image, generate a control command for controlling the robot in response to an input while the display outputs both the map image and the ambient image, and cause the robot to drive according to the control command by controlling the communication unit to transmit the control command to the robot.

As described above, the remote control method and system according to some example embodiments may provide a map image containing information on the location where the robot is located together with images received from the robot. Through this, the remote control method and system for a robot according to some example embodiments may provide a user experience that may comprehensively provide environmental information surrounding the robot under remote control situations. Therefore, users who remotely control the robot may perform more accurate control of the robot, taking into account its surroundings when remotely controlling the robot.

Furthermore, the remote control method and system according to some example embodiments may provide a user experience that may perform control over the display area together as well as control over the robot based on the user input for remote control of the robot. Therefore, users who remotely control the robot may perform tasks more easily and intuitively, depending on the situation, by performing control of the robot and control over the display area with one control command.

BRIEF DESCRIPTION OF THE DRAWINGS

FIG. 11 is a conceptual view for explaining control commands for remotely controlling a robot in the remote control method and system for a robot according to some example embodiments.

DETAILED DESCRIPTION

Description will now be given in detail according to some example embodiments disclosed herein, with reference to the accompanying drawings. For the sake of brief description with reference to the drawings, the same, similar or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In some example embodiments, that which is well-known to one of ordinary skill in the relevant art has generally been omitted for the sake of brevity. The accompanying drawings are used to help easily understand various technical features and it should be understood that some example embodiments presented herein are not limited by the accompanying drawings. As such, some example embodiments should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element may be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of features, numbers, operations, functions, several components, or combinations thereof, disclosed in the specification, and it is also understood that greater or fewer features, numbers, operations, functions, several components, or combinations thereof may likewise be utilized.

Figure 1:
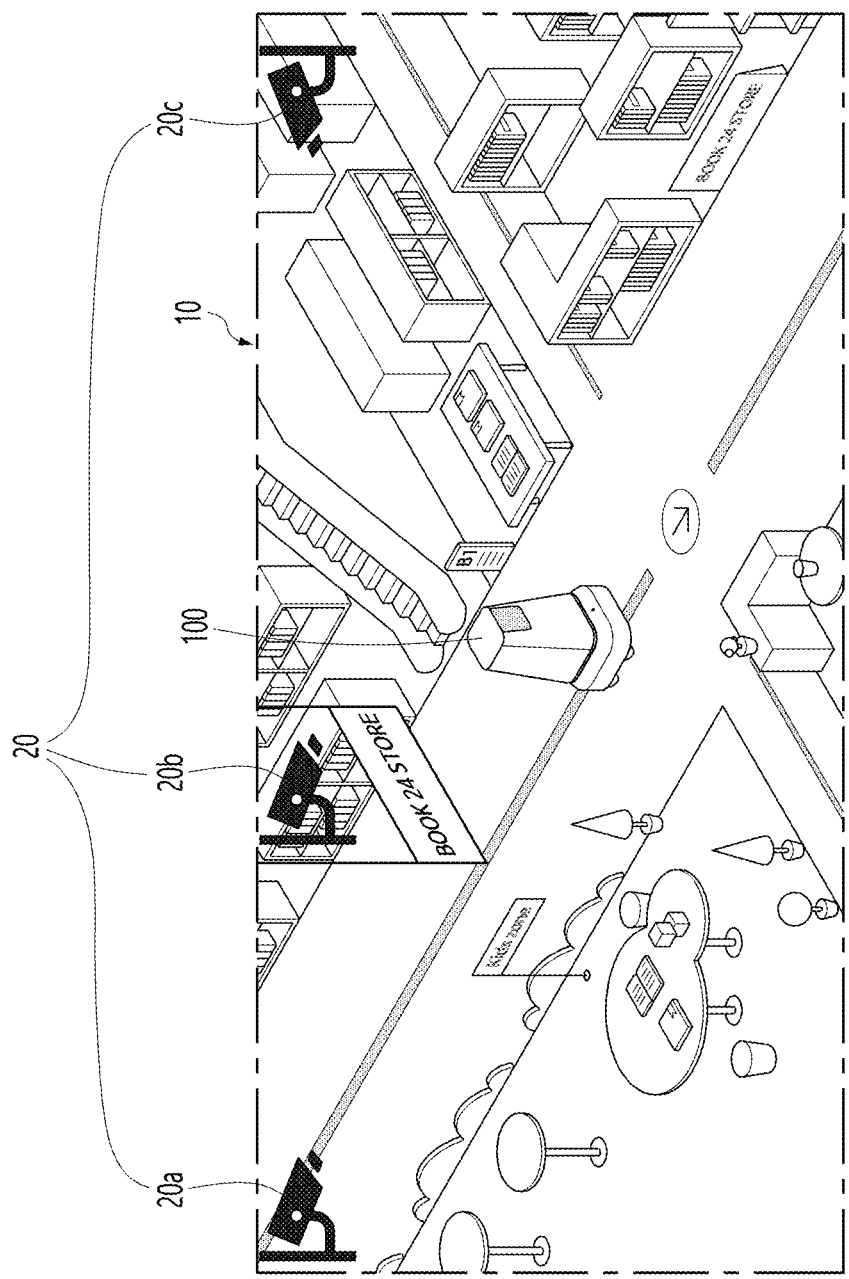
FIGS. 1 and 2 are conceptual views illustrating a remote control method and system for a robot according to some example embodiments.
Figure 2:
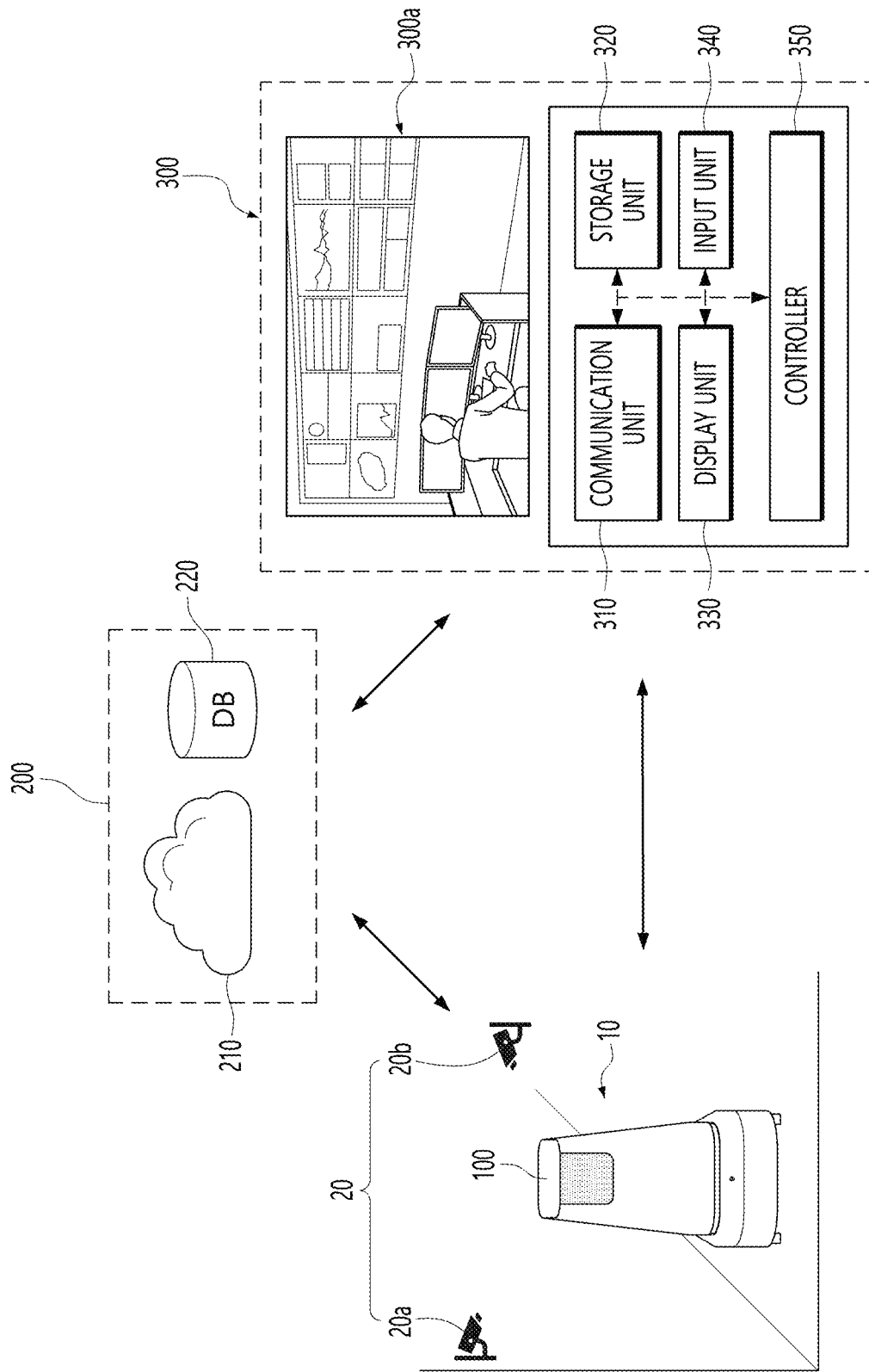

Some example embodiments provide a remote control method and system for a robot, and more particularly, provides a method and system that remotely controls navigation of a robot more intuitively. Hereinafter, a space where a robot drives and a robot remote control system surrounding the space will be described, with reference to the accompanying drawings. FIGS. 1 and 2 are conceptual views illustrating a remote control method and system for a robot according to some example embodiments.

As shown in FIG. 1, as technology advances, the utilization of robots is gradually increasing. Robots have traditionally been used in special industries (e.g., industrial automation related fields), but are increasingly transformed into service robots that may perform useful tasks for humans or facilities.

A robot capable of providing such diverse services may be configured to drive in the space 10, as shown in FIG. 1, to perform assigned tasks. There is no limit in the type of space in which the robot drives, and it may be made to drive at least one of indoor and/or outdoor spaces. For example, indoor spaces may be a variety of spaces, such as department stores, airports, hotels, schools, buildings, subway stations, train stations and/or bookstores. Thus, the robot may be arranged in various spaces to provide useful services to humans.

In order to provide a variety of services using a robot, accurate control of the robot is an important factor. Thus, some example embodiments provide a method to remotely and more accurately control the robot using a camera provided at the robot and a map image for the space. The robot according to some example embodiments may be referred to variously, for instance, as an unmanned moving machine, an autonomous moving machine, etc.

As shown in FIG. 1, a camera 20 may be placed in the space 10 where the robot 100 is located. As shown, the number of the camera 20 placed in the space 10 is unlimited. Multiple cameras 20a, 20b and 20c may be placed in the space 10, as shown. The type of the cameras 20 placed in the space 10 may vary, and in some example embodiments, a closed circuit television (CCTV) placed in the space 10 may be utilized.

As shown in FIG. 2, some example embodiments allow a robot remote control system 300 to remotely control navigation of the robot 100.

As shown in FIG. 2, the robot remote control system 300 according to some example embodiments may include at least one of a communication unit 310, a storage unit 320, a display unit 330 (also referred to herein as a "display"), an input unit 340, and/or a controller 350.

The communication unit 310 may be configured to communicate with a variety of devices placed in the space 10, in a wireless and/or wired manner. The communication unit 310 may communicate with the robot 100 as shown in the drawings. The communication unit 310 may be configured to communicate with the robot 100 to receive images captured from a camera provided at the robot 100.

Furthermore, the communication unit 310 may perform direct communication with the camera 20 placed in the space 10. Furthermore, the communication unit 310 may be configured to communicate with an image control system that controls the camera 20.

Furthermore, the communication unit 310 may be configured to communicate with at least one external server (or external storage unit 200). The external server 200 may be configured to include at least one of a cloud server 210 and/or a database 220 as shown. The external server 200 may be configured to perform at least a part of the controller 350. In other words, performance such as data processing or data computation may be performed on the external server 200 (instead of or in addition to on the controller 350), and some example embodiments do not impose any particular restrictions on this approach.

The communication unit 310 may support a variety of communication methods according to communication standards of devices with which it communicates.

For instance, the communication unit 310 may be configured to communicate with a device (including a cloud server) located in and out of the space 10, using at least one of WLAN(Wireless LAN), Wi-Fi(Wireless-Fidelity) Direct, DLNA(Digital Living Network Alliance), WiBro(Wireless Broadband), WiMAX(World Interoperability for Microwave Access), HSUPA(High Speed Uplink Packet Access), LTE(Long Term Evolution-Advanced), 5G($5^{th}$ Generation Mobile Telecommunication), Bluetooth™, RFID(Radio Frequency Identification), Infrared Data Association; IrDA, UWB(Ultra-Wideband), ZigBee, NFC(Near Field Communication), and/or Wireless USB(Wireless Serial Bus).

The storage unit 320 may be configured to store various information. In some example embodiments, the storage unit 320 may be provided at the robot remote control system 300 itself. In contrast, at least a part of the storage unit 320 may mean at least one of the cloud server 210 and/or the database 220. That is, it may be understood that the storage unit 320 is sufficient if information used for robot remote control according to some example embodiments is stored, and there is no constraint on physical space. Thus, the storage unit 320, the cloud server 210 and/or the database 220 may not be separately identified, but all of them may be described as the storage unit 320. The cloud server 210 may mean "cloud storage".

First, information on the robot 100 may be stored in the storage unit 320.

Information about the robot 100 may vary widely and may include, for example, i) identification information (for instance, serial numbers, TAG information, Quick Response (QR) code information, and etc.) for identifying the robot 100 placed in the space 10, ii) task information assigned to the robot 100, iii) navigation path information set to the robot 100, iv) location information of the robot 100, v) status information of the robot 100 (for example, a power condition, presence of a malfunction, a battery condition, etc.), vi) image information received from the camera provided at the robot 100, etc.

In the storage unit 320, a map (or map information) for the space 10 may be stored. The map may be configured as at least one of a two dimensional map and/or a three dimensional map. The map for the space 10 may mean a map which may be utilized to grasp (check, determine, etc.) a current location of the robot 100, and/or to establish the robot's navigation path.

In particular, in the remote control system 300 according to some example embodiments, it is possible to grasp a location of the robot 100 based on images received from the robot 100. To this end, a map for the space 10 stored in the storage unit 320 may consist of data that allows location estimation based on images.

The map for the space 10 may be a map preset or alternatively, given based on Simultaneous Localization and Mapping (SLAM) by at least one robot moving in the space 10. The map for the space 10 may be represented as a map image.

In addition to the types of information listed above, various information may be stored in the storage unit 320.

The display unit 330 may be configured to output at least one of an image received from the camera provided at (e.g., on) the robot 100 and/or a map image of the space 10. The display unit 330 may be equipped in a device of a manager who manages the robot 100 remotely, and may be installed in a remote control room 300a as shown in FIG. 2. Alternatively, the display unit 330 may be a display equipped in a mobile device. As such, some example embodiments do not have any restrictions on the type of the display unit.

The input unit 340 is for inputting information from a user (or a manager), which may be a medium between the user (or the manager) and the robot remote control system 300. More specifically, the input unit 340 may mean an input means of receiving a control command for remotely controlling navigation of the robot 100 from the user.

There may be no specific restrictions on the type of the input unit 340, and the input unit 340 may include at least one of a mechanical input means (or mechanical keys, e.g., a mouse, a joystick, physical buttons, a dome switch, a jog wheel, a jog switch, etc.) and/or a touch-type input means. For example, the touch-type input means may be a virtual key, a soft key, or a visual key that is displayed on a touch screen through software processing, or may be a touch key that is placed outside the touch screen. The virtual key or the visual key may be displayed on the touch screen in various forms, for example, graphics, texts, icons, videos, or a combination thereof. When the input unit 340 includes a touch screen, the display unit 330 may be configured as a touch screen. In this instance, the display unit 330 may perform both a role of outputting information and a role of receiving information.

The controller 350 may be configured to control the overall operations of the robot remote control system 300. The controller 350 may process signals, data, information, etc. that are input or output through the components shown above (e.g., the communication unit 310, the storage unit 320, the display unit 330 and/or the input unit 340), or provide or process appropriate information or functions to the user.

In particular, the controller 350 may be configured to remotely control the robot 100 using an image received from the camera provided at the robot 100, and a map image about the space 10. For intuitive remote control of the robot 100, the controller 350 may extract location information where the robot 100 is located in the space from an image received from the camera provided at the robot 100. In addition, the controller 350 may extract a map image corresponding to the location information of the robot 100 extracted from the storage unit 320. Furthermore, the controller 350 may control the display unit 330 to output the image and the map image together. In addition, the controller 350 may perform remote control over the robot 100, based on a user input that is input to the display unit 330 via the input unit 340.

Below, descriptions will be more specifically given of a method to estimate the current location of the robot 100 and to specify a map image based on the image received from the robot 100 with the accompanying drawings. FIGS. 3A, 3B, 3C, 4A and 4B are conceptual views illustrating a method to estimate the current location of the robot based on images collected from the robot.

Figure 3A:
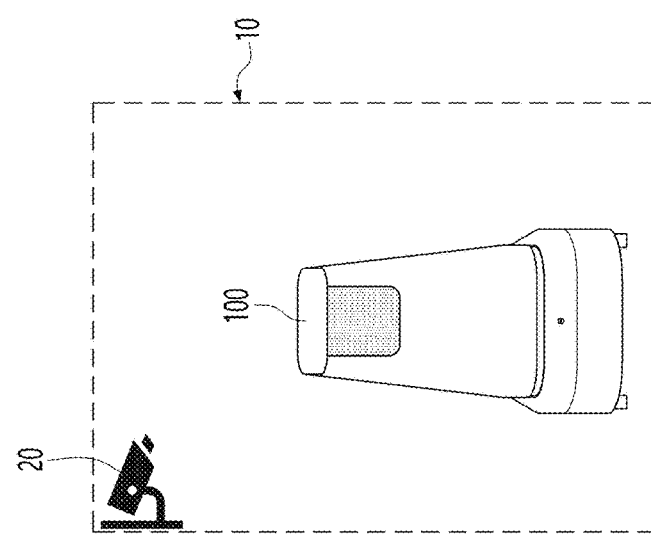
FIGS. 3A, 3B, 3C, 4A and 4B are conceptual views illustrating a method to estimate a current location of a robot based on images collected by the robot, in the remote control method and system for a robot according to some example embodiments.

As described above, the controller 350 according to some example embodiments may be configured to, using the camera (not shown) provided at the robot 100 (e.g., a camera on the robot 100 and/or a camera nearby the robot 100), receive images about the space 10 and to perform Visual Localization to estimate the robot's location from the received images. Referring to FIG. 3A, the camera provided at the robot 100 may be configured to capture (or sense) images about the space 10, e.g., images around the robot 100. Hereinafter, for convenience of explanation, images acquired using the camera provided at the robot 100 may be referred to as "ambient images".

Figure 3B:
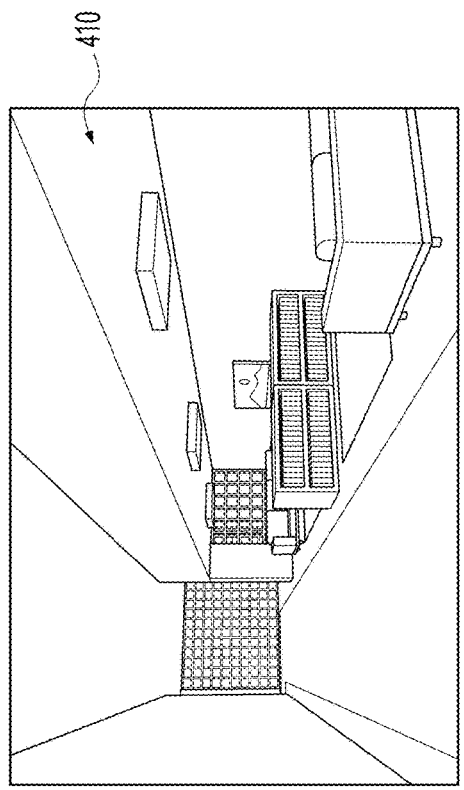

The controller 350 may be configured to acquire am ambient image 410 through the camera provided at the robot 100 as shown in FIG. 3B. In addition, the controller 350 may estimate the current location of the robot 100 based on the acquired ambient image 410.

Figure 3C:
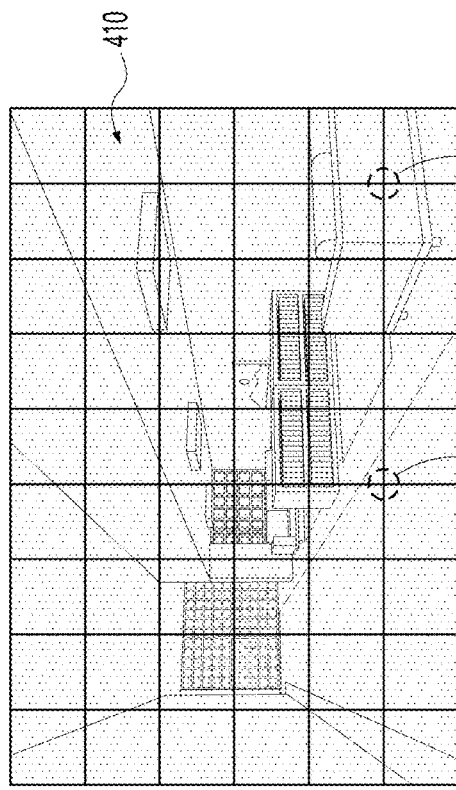

The controller 350 may compare the ambient image 410 with the map information stored in the storage unit 320 to extract location information corresponding to the current location of the robot 100, as shown in FIG. 3C.

As described above, the map for the space 10 according to some example embodiments may be a map preset or alternatively, given based on Simultaneous Localization and Mapping (SLAM) by at least one robot moving in the space 10. Specifically, the map for the space 10 may be a map generated based on image information.

In other words, the map for the space 10 may be a map generated by a vision (or visual)-based SLAM technology.

Thus, the controller 350 may specify coordinate information (e.g., section of B on the third floor (3,1,1)), section of B on the third floor (7, 1, 1)) with respect to the ambient image acquired from the robot 100, as shown in FIG. 3C. As such, the specific coordinate information may become the current location information of the robot 100.

Here, the controller 350 may estimate the current location of the robot 100 by comparing the ambient image 410 acquired from the robot 100 with the map generated by the vision (or visual)-based SLAM technology. In this case, the controller 350 may i) specify an image most similar to the ambient image 410 by using image comparison between the ambient image 410 and images that constitute the pre-generated or generated map, and ii) specify location information of the robot 100 by acquiring location information that is matched with the specified image.

Figure 4A:
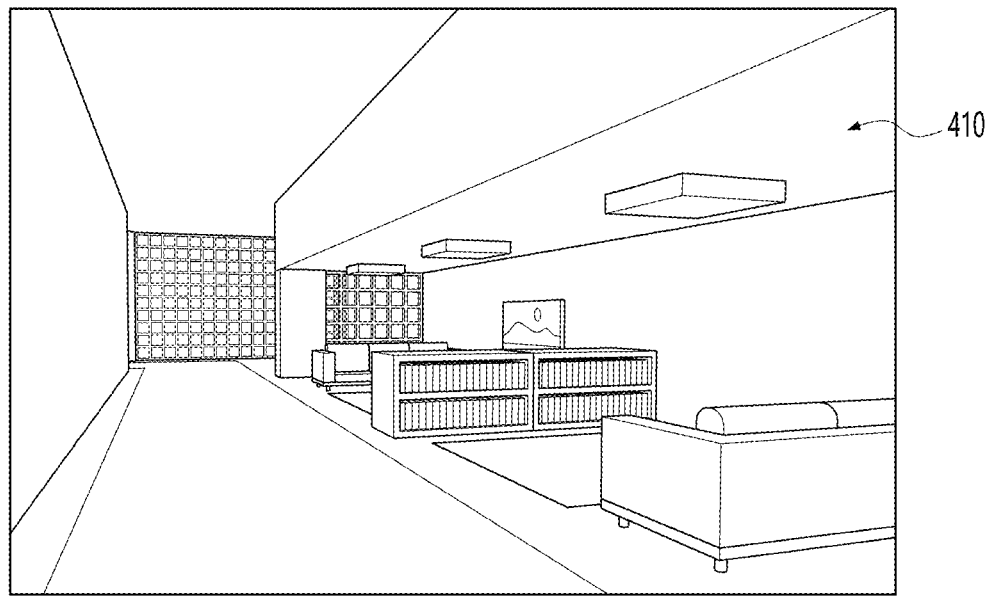

As such, the controller 350 may specify the current location of the robot by using the ambient image 410 acquired from the robot 100, as shown in FIG. 4A. As described above, the controller 350 may extract location information (e.g., coordinate information) corresponding to the ambient image 410, from the map information stored in the storage unit 320 (e.g., may be also referred to as a "reference map").

Figure 4B:
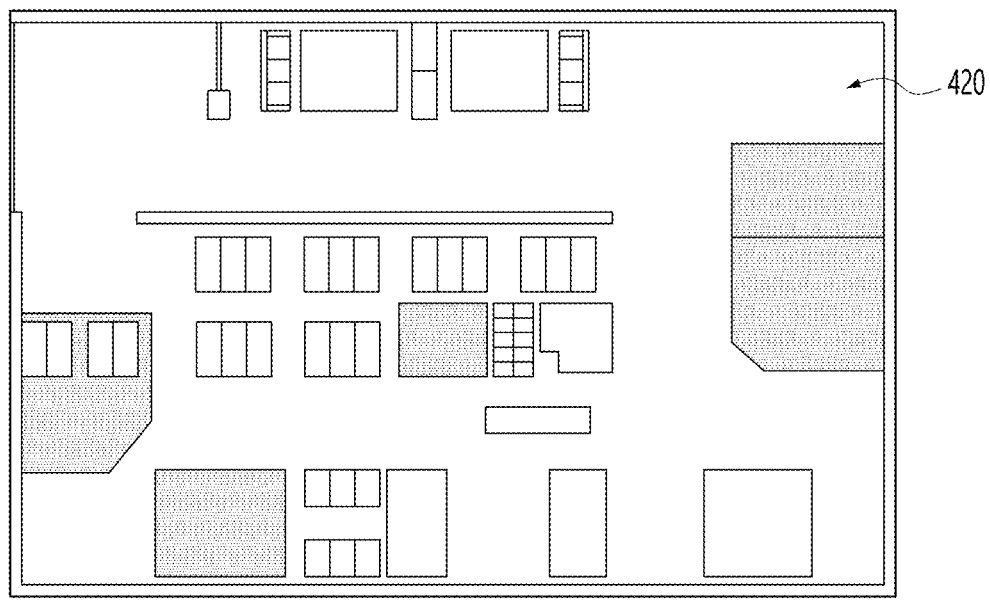

In addition, the controller 350 may specify a map image 420 corresponding to the extracted location information, as shown in FIG. 4B. The map image, in some example embodiments, which consists of a two-dimensional image or a three-dimensional image, may be configured as an image which visualizes the space 10 where the robot is located. The map image may be made to contain location information corresponding to the ambient image 410 acquired from the robot 100.

The map image may be in a variety of forms, and may be configured as an image substantially acquired from the camera. In this case, the map image may be constructed by using at least one of an image acquired from the camera 20 placed in the space 10 and/or an image acquired from the robot 100.

In contrast, the map image may consist of an image that reduces the space 10 to a certain scale, rather than an image acquired from the camera. The map image may be an image configured to contain some information on the space 10, rather than all the real objects that constitute the space 10. Some information on the space 10, may be used to determine navigation and a path of the robot 100, may include column information, ceiling information, wall information, space separation information, and/or information on furniture placed in the space 10.

In some example embodiments, the controller 350 may output the map image corresponding to the space in which the robot is located, as well as the ambient image 410 acquired by the robot itself, for remote control of the robot 100. Therefore, some example embodiments allow a manager who remotely controls the robot 100, to perform remote control over the robot 100, by considering the space in which the robot 100 is located, as well as the ambient image acquired from the robot 100.

When outputting the map image to the display unit 330, the controller 350 may control an output magnification of the map image 420 so as to provide information about the space 10 at a different magnification from the ambient image 410 of the robot 100. In other words, the controller may control the output magnification of the map image 420 so as to provide information about the space 10 at a wider angle of view than the ambient image 410. In this case, the user may consider information about the space 10 more comprehensively when remotely controlling the robot 100.

In some example embodiments, the ambient image and the map image may be output together to the display unit 330, and the robot 100 may be controlled remotely, based on a user input applied to at least one of the ambient image and the map image via the input unit 340. In some example embodiments, user convenience may be enhanced by utilizing a control command for remotely controlling the robot 100 as a control command to control the display unit 330 as well as the robot 100. According to some example embodiments, the robot 100 may include a communication unit to receive the control command from the robot remote control system 300; a controller; and a driving unit to move under the control of the controller. The controller may determine a control instruction based on the control command (e.g., to effect movement of the robot to a position indicated by the control command), and control the driving unit to move the robot using the control instruction. According to some example embodiments, the driving unit may include a motor and/or servo connected to a power source. According to some example embodiments, the communication unit of the robot 100 may be the same as or similar to the communication unit 310. According to some example embodiments, the controller 350 may cause the robot 100 to drive to a position corresponding to the control command by transmitting the control command to the robot 100.

Figure 5:
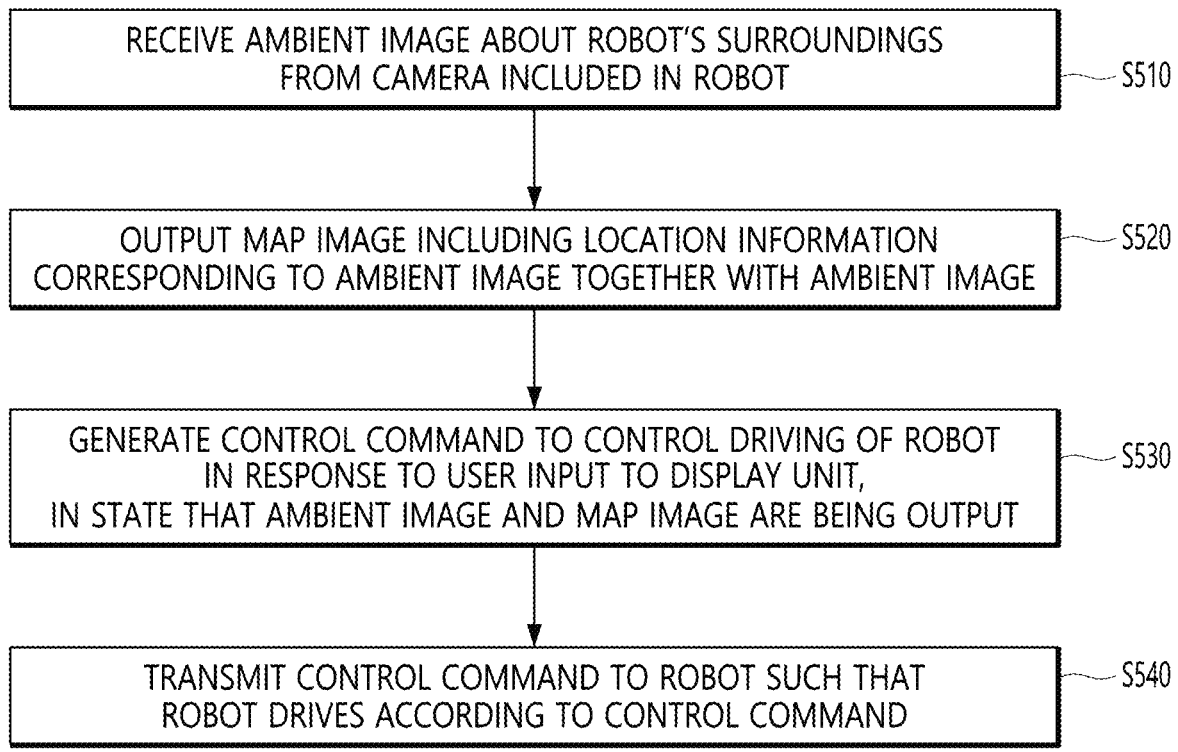
FIG. 5 is a flowchart illustrating a remote control method for a robot according to some example embodiments.

Below, detailed descriptions will be given with reference to the attached drawings. FIG. 5 is a flowchart illustrating a robot remote control method according to some example embodiments. In addition, FIGS. 6A, 6B, 7A, 7B, 7C, 7D, 8A, 8B, 8C, 8D, 9A, 9B, 9C, 9D, and FIG. 10 are conceptual views illustrating how to remotely control the robot in the robot remote control method and system according to some example embodiments. And FIG. 11 is a conceptual view for explaining a control command for remotely controlling the robot, in the robot remote control method and system according to some example embodiments.

First, in the robot remote control method according to some example embodiments, a process of receiving an ambient image about the surroundings of the robot from the camera provided at the robot may be performed (S510).

The controller 350 may receive the ambient image from the robot 100 using the communication unit 310. The robot 100 may be a robot which is a subject to remote control. Specifying the robot 100 which is a subject to remote control may be performed variously, and there is no concrete limitation in some example embodiments. In other words, once the robot which is a subject to be remotely controlled is specified in various ways, the controller 350 may receive the ambient image from the robot 100 which is a subject to remote control.

As such, when the ambient image is received from the robot 100, the controller 350 may estimate the current location of the robot 100 by using the received ambient image. Through Visual Localization, the controller 350 may specify the current location of the robot 100. The controller 350 may compare the ambient image with the map information stored in the storage unit 320, thereby extracting location information corresponding to the current location of the robot 100 as shown in FIG. 3C.

As described above, in some example embodiments, the map for the space 10 may be a map prepared in advance based on Simultaneous Localization and Mapping (SLAM) by at least one robot that moves in the space 10, and may be a map generated based on image information. In other words, the map for the space 10 may be a map generated by vision (or visual)-based SLAM technology.

The controller 350 may estimate the current location of the robot 100 by comparing the ambient image obtained from the robot 100 with the map generated by the vision (or visual)-based SLAM technology. In this case, the controller 350 may specify the location information of the robot 100 by i) specifying an image most similar to the ambient image, using image comparison between the ambient image 410 with images that constitute the pre-generated or generated map, and ii) acquiring location information that is matched with the specified image. As such, the controller 350 may specify the robot's current location, by using the acquired ambient image 410 when the ambient image 410 is acquired from the robot 100, as shown in FIG. 4A. As noted earlier, the controller 350 may extract location information (e.g., coordinate information) corresponding to the ambient image 410, from the map information stored in the storage unit 320 (e.g., may also be referred to as "reference map").

In addition, the controller 350 may specify a map image corresponding to the location information extracted by using the ambient image, as shown in FIG. 4B, as previously described. In some example embodiments, the map image implemented as a two-dimensional image or a three-dimensional image may be configured as an image to visualize the space 10 where the robot is located. The map image may be made to contain location information corresponding to the ambient image 410 acquired from the robot 100.

As described above, the controller 350 may specify the map image containing location information corresponding to the ambient image acquired from the robot 100. The map image may be stored in the storage unit 320.

The controller 350 may specify a location corresponding to coordinate information corresponding to image information, and may specify a map image corresponding to the location. The specific map image may correspond to at least a part of the entire map image for the space 10. In other words, the controller 350 may extract a part containing a location corresponding to the ambient image from the entire map image for the space 10, and specify the extracted part as a map image corresponding to the robot's current location 100.

As such, in some example embodiments, when the current location of the robot 100 is specified, may be performed a process of outputting the map image containing location information corresponding to the ambient image, together with the ambient image acquired from the robot (S520).

Figure 6A:
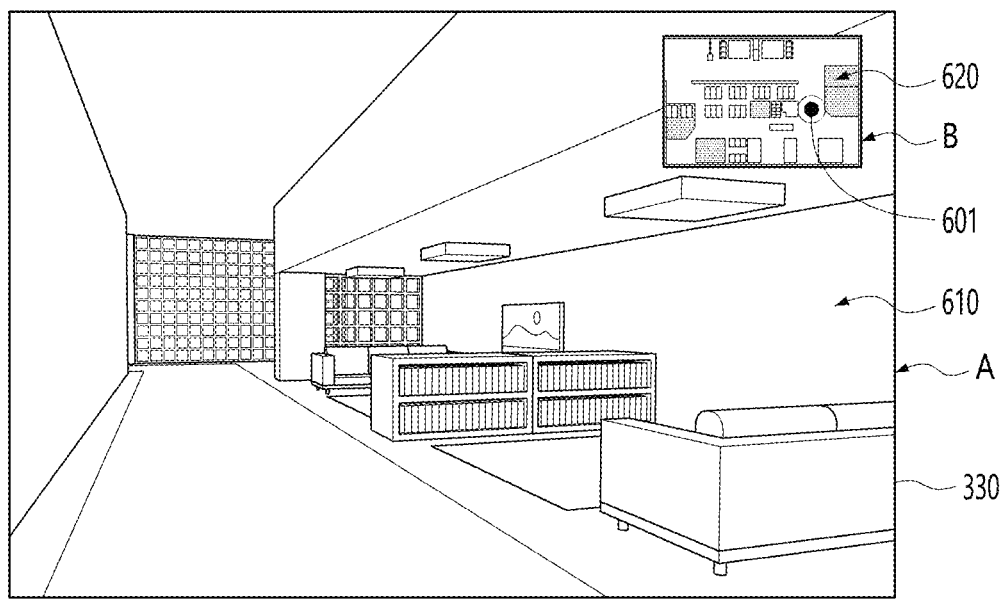
FIGS. 6A, 6B, 7A, 7B, 7C, 7D, 8A, 8B, 8C, 8D, 9A, 9B, 9C, 9D and 10 are conceptual views illustrating a method to remotely control a robot in the remote control method and system for a robot according to some example embodiments.
Figure 6B:
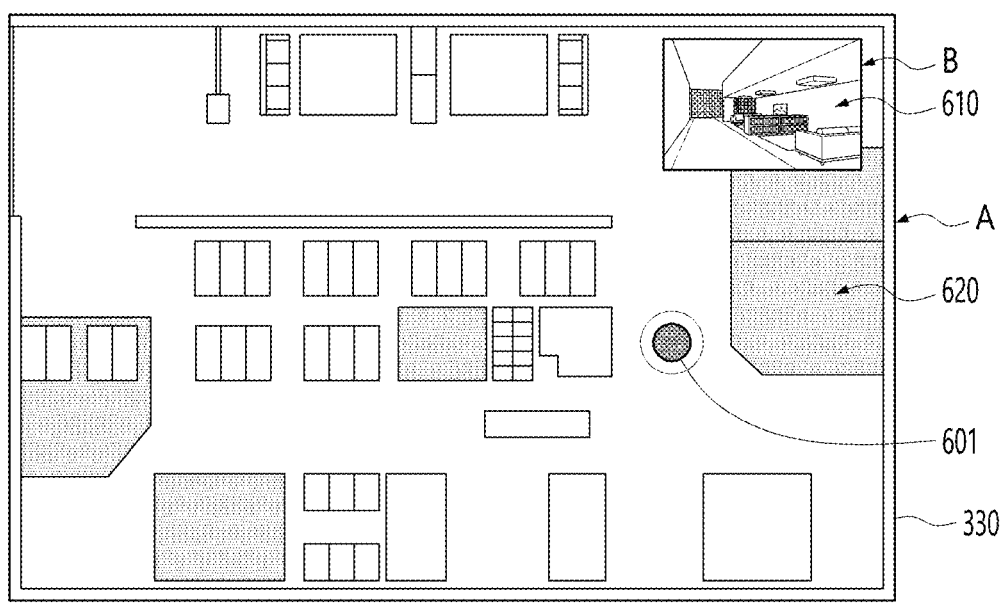

More specifically, the controller 350 may control the display unit 330 to output an ambient image 610 and a map image 620 together, as shown in FIGS. 6A and 6B.

As shown in FIGS. 6A and 6B, the display unit 330 may include a main area (A) and a sub-area (B) that overlaps at least a part of the main area (A). On the display unit 330, an area where visual information is displayed may be referred to as a "display area". In this case, the display area of the display unit 330 may be expressed to contain the main area (A) and the sub-area (B) that overlaps at least a part of the main area (A).

The position where the sub-area (B) overlaps the main area (A) may be changed based on a user input. Furthermore, of course, an output size of at least one of the main area (A) and the sub-area (B) may also be changed based on a user input.

In the above example, the case where the sub-area (B) is overlapped on the main area (A) was described, but some example embodiments are not limited to the above example. For example, the display unit 330 may be divided into multiple display areas, one of them may be the main area (A) and the other may be the sub-area (B). The main area (A) and the sub-area (B) may not overlap each other, or at least a part may overlap each other. In the some example embodiments, the size of the main area (A) may be larger than that of the sub-area (B).

For convenience of explanation, it may be explained in an example that the sub-area (B) overlaps at least a part of the main area (A). However, controls and interactions described below may also be applied to other screen configurations.

As described above, the display unit 330 may include the main area (A) and the sub-area (B), and in some example embodiments, one of an ambient image received from the robot 100 and/or a map image containing location information corresponding to the ambient image may be output to the main area (A) and the other may be output to the sub-area (B).

As shown in FIGS. 6A and 6B, the controller 350 may control the display unit 330 to output the ambient image 610 to one of the main area (A) and/or the sub-area (B), and to output the map image 620 to the other. For example, when the ambient image 610 captured from the robot 100 is output to the main area (A) as shown in FIG. 6A, the map image 620 containing the location information corresponding to the ambient image may be output to the sub-area (B). Contrary to this, when the map image 620 containing the location information corresponding to the ambient image 610 is output to the main area (A) as shown in FIG. 6B, the ambient image 610 captured by the robot 100 may be output to the sub-area (B).

Furthermore, a graphic object 601 representing a current location of the robot 100 may be further output to the area where the map image 620 is output between the main area (A) and the sub-area (B) of the display unit 330. In other words, the controller 350 may display information on a location of the robot 100 in a space corresponding to the map image 620, by using the graphic object 601 such that the user remotely controls the robot 100 in an intuitive manner.

As such, the map image 620 output to the display unit 330 may contain the graphic object 601 representing the robot 100. And, the graphic object 601 may be located in the area corresponding to the current location of the robot on the map image 620.

When the robot 100 drives, the output location of the graphic object 601 on the map image 620 may change in conjunction with the navigation of the robot 100. The controller 350 may control the display unit 330 to change the output location of the graphic object 601 according to a changed current location of the robot 100, in a case that the current location of the robot 100 is changed. Thus, the user may intuitively grasp the location of the robot 100 in the space 10 through the location of the graphic object 601 on the map image 620. The controller 350 may continuously track the location of the robot 100 from images received from the robot 100 by using visual localization, while the robot 100 drives.

While the ambient image and the map image are being output to the display unit 330, when a user input to the display unit 330 is received, in some example embodiments, a process of generating a control command to control the robot's navigation may be performed (S530). In addition, in some example embodiments, a process of transmitting the control command to the robot 100 may be performed (S540) such that the robot 100 drives according to the control command. Upon receipt of the control command, the robot 100 may be controlled to drive according to the control command.

More specifically, as previously described, the user input may be applied through the input unit 340. The type of the input unit 340 may be various, and the input unit 340 may include at least one of a mechanical input means (or mechanical keys, for example, a mouse, a joystick, physical buttons, a dome switch, a jog wheel, a jog switch, etc.), and/or a touch input means.

Furthermore, the user input to the display unit 330 may include at least one of i) an input applied through a direct touch to the display unit 330 configured as a touch screen, and/or ii) an input applied to the display unit 330 by using a separate input means such as a mouse as a medium.

For example, when the user input is received by an input means such as a mouse, the display unit 330 may output a graphic object (e.g., cursor image 701) moving on the display unit 330 in response to the user input, as shown in FIGS. 7A, 7B, 7C and 7D. Through the cursor image 701, the user may see a point (or an area) on the display unit 330, to which the user input through the input unit 340 is being applied. The graphic object such as the cursor image 701 may be output, even when the user input is performed through the touch screen. Hereinafter, descriptions will be explained without a limitation to a specific input means of receiving an input from the user. In other words, a user input applied to the display unit 330 via the touch screen or other input means will be described as "a user input to the display unit". According to some example embodiments, the user input corresponding to the cursor image 701 may correspond to the graphic object 702 indication a current location of the robot.

The controller 350 may generate a control command to control navigation of the robot 100 in response to a user input, in a case that the user input to the display unit 330 is received while the ambient image and the map image are being output to the display unit 330, as shown in FIGS. 6A and 6B. For example, the control command may include various commands related to navigation of the robot, such as a navigation direction of the robot, a navigation speed, whether there exists navigation or not, a navigation distance, a navigation path, etc. The robot 100 may drive based on a control command received through the robot remote control system 300.

The controller 350 may generate a control command related to the robot's navigation, based on a user input applied to the display unit 330 through the input unit 340. In this case, the controller 350 may also perform control of the display unit 330, according to an area (a point) on the display unit 330 to which the user input through the input unit 340 has been applied.

In other words, the controller 350 may process the user input to the display unit 330 as a control command for the display unit 330, as well as a control command for the robot 100.

As such, the controller 350 may perform different controls (or different data processing) according to a point (an area) on the display unit 330 to which the user input through the input unit 340 has been applied.

More specifically, the controller 350 may perform control over the display area, together with generation of the control command to control navigation of robot, according to whether the user input has been applied to the main area (A) or the sub-area (B) of the display unit 330.

As described above, the size of the main area (A) may be formed to be larger than that of the sub-area (B), and the user may want to see information displayed on the sub-area (B) larger. That is, in this case, visual information being output to the main area (A) and the sub-area (B), respectively, should be converted from each other. In some example embodiments, a user input to control the robot 100 may also be utilized for control over the display unit 330 in order to solve or reduce the user's inconvenience in inputting an additional control command to switch information output from the main area (A) and the sub-area (B) from each other.

Figure 7A:
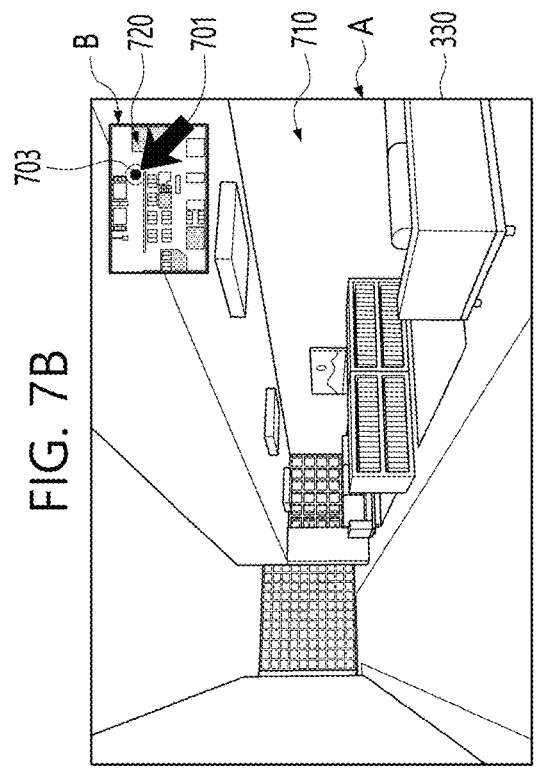
Figure 7B:
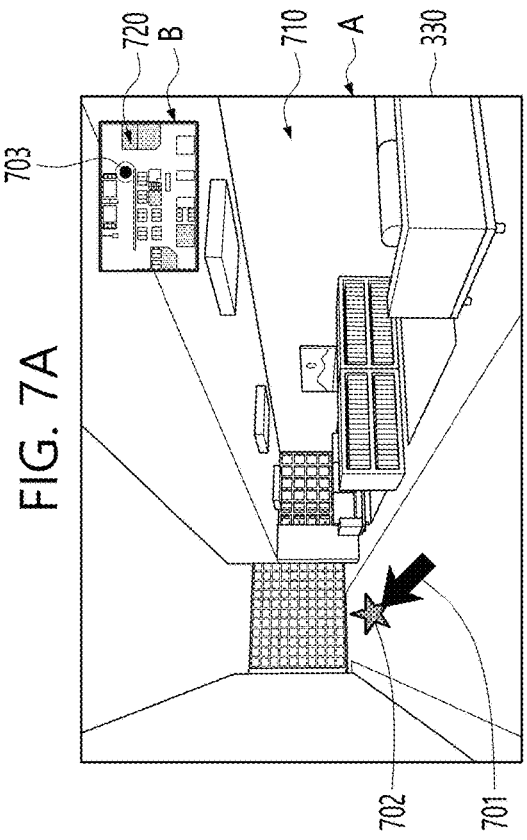

The controller 350 may determine that a control command has been input to convert information output to the main area (A) and the sub-area (B) from each other, in a case that a user input is applied to the sub-area (B) between the main area (A) and the sub-area (B), as shown in FIG. 7B. In other words, the controller 350 may process an event that a user input has been applied to the sub-area (B) (in which may be output the map image 720 or the ambient image 710), as shown in FIG. 7B and FIG. 7D, as a control command to "convert information output to the main area (A) and the sub-area (B)".

Figure 7C:
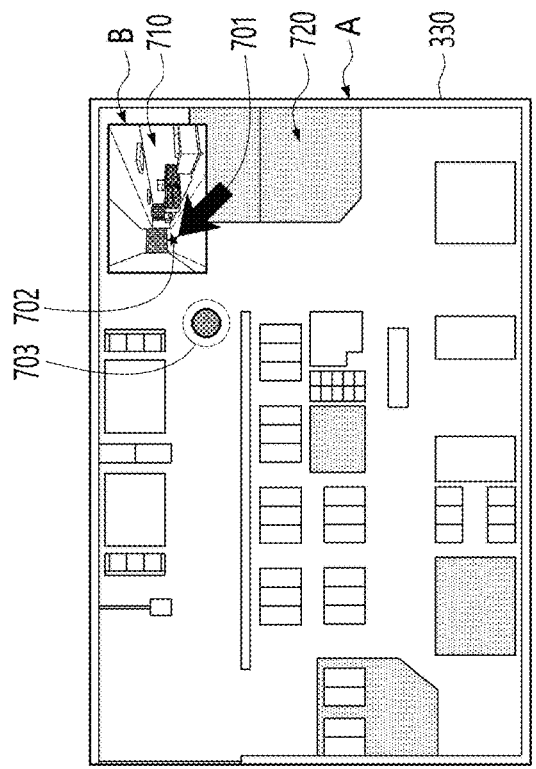
Figure 7D:
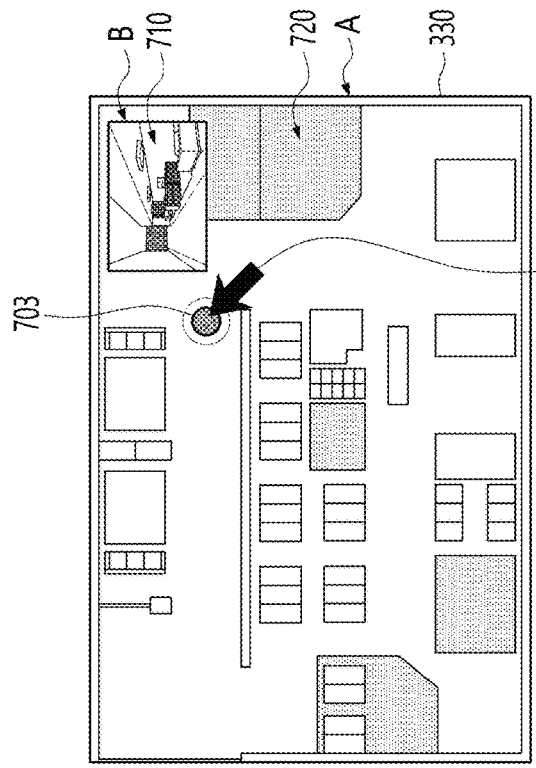

Thus, the controller 350 may perform control related to the display areas of the display unit 330 (e.g., the main area (A) and the sub-area (B)) together with generation of a control command to control navigation of the robot 100, in a case that a user input is applied to the sub-area (B), as shown in FIG. 7B and FIG. 7D.

Conversely, the controller 350 may generate only a control command for controlling the robot 100, without performing control associated with the display unit 330 (e.g., the main area (A) and the sub-area (B)), in a case that a user input is applied to the main area (A) (in which may be output the map image 720 or the ambient image 710), as shown in FIG. 7A and FIG. 7C.

Figure 8A:
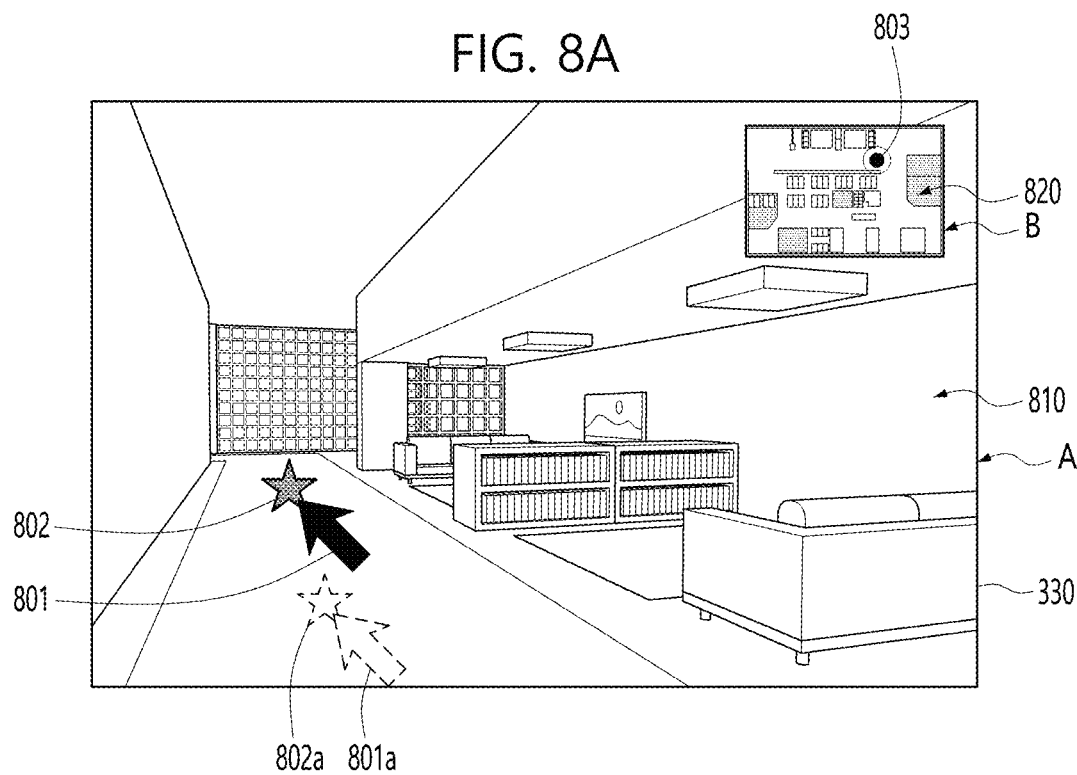
Figure 8B:
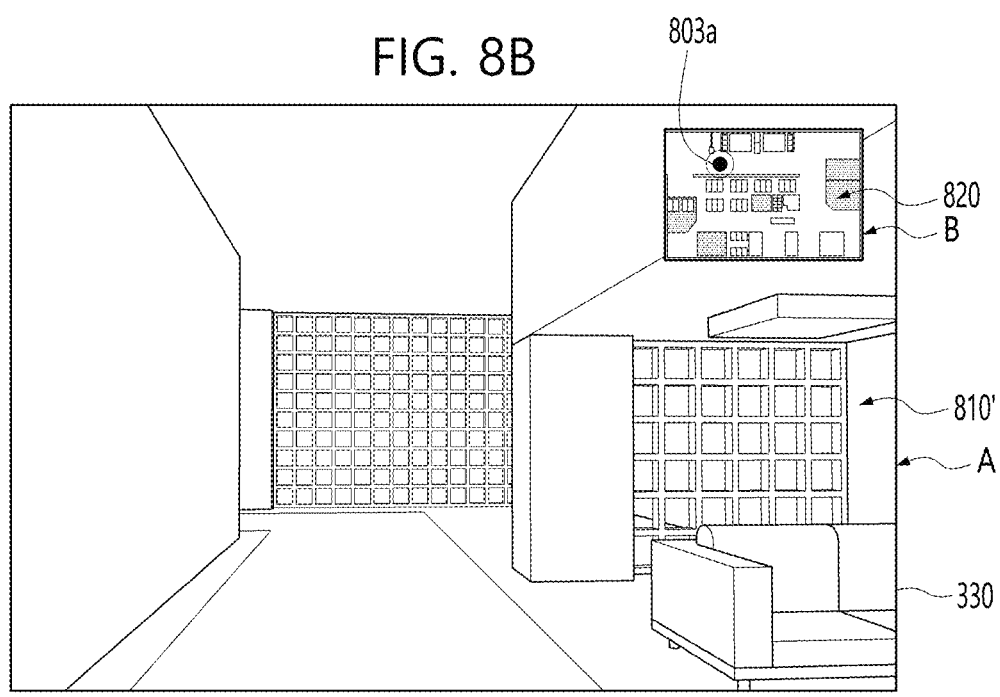

For specific example, as shown in FIGS. 8A and 8B, an ambient image 810 captured by the robot 100 may be output to the main area (A) of the display unit 330 and a map image 820 for a location corresponding to the location information of the robot 100 may be output to the sub-area (B) of the display unit 330. As such, while the ambient image 810 and the map image 820 are being output to the main area (A) and the sub-area (B), respectively, when a user input via the input unit 340 is applied to the main area (A), the controller 350 may generate a control command related to navigation of the robot 100 corresponding to the user input, in response to the user input. For example, when the user input is a control command that allows the robot 100 to drive forward in one direction (from 802a to 802), the robot 100 may drive along the one direction according to the control command. As a result, as shown in FIG. 8B, an ambient image 810' output to the main area (A) may differ from the ambient image 810 (refer to FIG. 8A), before the robot 100 drives based on the control command. In other words, the controller 350 may receive images from the robot 100 in real time or at preset (or alternatively, given) time intervals, and output a most-recently received ambient image to the main area (A).

The user input to control navigation of the robot 100 may be a drag input applied to the display unit 330 via the input unit 340. The controller 350 may generate a control command to control the robot's navigation, based on a user input to drag cursor images 801a and 801 along one direction (from 802a to 802), as shown in FIG. 8B.

Furthermore, when the robot's current location is changed as the robot drives according to the above control command, the output location of a graphic object 803a representing the robot's current (e.g., final) location on the map image 820 output to the sub-area (B) may be also changed (e.g., with respect to the initial output location of a graphic object 803 as shown in FIG. 8A), as shown in FIG. 8B. Though not shown, location information contained in the map image may be changed at least partially in conjunction with navigation of the robot 100. In other words, the controller 350 may update the map image in real time or at preset (or alternatively, given) time intervals so that the map image contains location information which is within a preset or alternatively, given range on the basis of the robot's current location.

As shown in FIGS. 8A and 8B, the controller 350 may generate a control command to control only navigation of the robot 100 when a user input is applied to the main area (A).

Figure 8C:
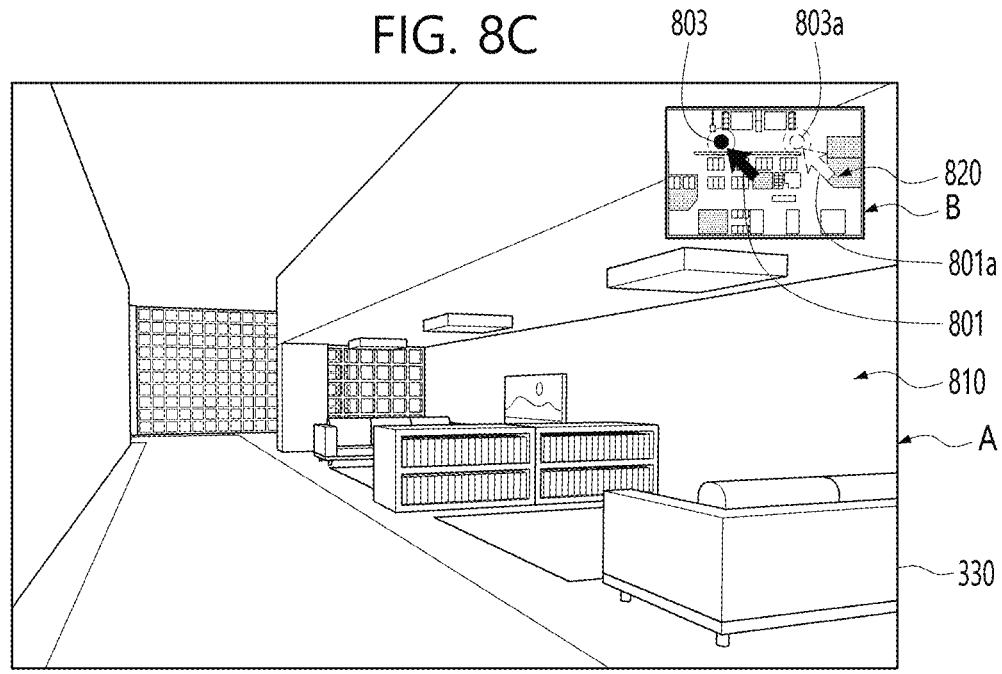

Next, will be described the opposite case to the example shown above. As shown in FIG. 8C, the main area (A) of the display unit 330 may output the ambient image 810 captured by the robot 100, and the sub-area (B) of the display unit 330 may output the map image 820 of a location corresponding to the location information of the robot 100. As such, while the ambient image 810 and the map image 820 are being output to the main area (A) and the sub-area (B), respectively, when a user input through the input unit 340 is applied to the sub-area (B), the controller 350 may generate a control command related to navigation of the robot 100 corresponding to the user input in response to the user input. For example, when the user input is a control command that allows the robot 100 to drive forward in one direction, the robot 100 may drive along the one direction according to the control command.

Furthermore, in response to a user input applied to the sub-area (B) as shown in FIG. 8C, the controller 350 may i) generate a control command to control navigation of the robot 100, ii) control the display unit 330 to output the map image 820 that was being output to the sub-area (B) to the main area (A), as shown in FIG. 8C and (b), and/or iii) control the display unit 330 to output the ambient image 810 that was being output to the main area (A) to the sub-area (B).

In other words, the controller 350 may convert visual information output to the main area (A) and the sub-area (B) from each other when a user input is applied to the sub-area (B).

As described above, the user input to control navigation of the robot 100 may be a drag input applied to the display unit 330 via the input unit 340. The controller 350 may generate a control command to control the robot's navigation, based on the user input which drags cursor images 801a and 801 along one direction (from 803a to 803), as shown in FIG. 8C.

Figure 8D:
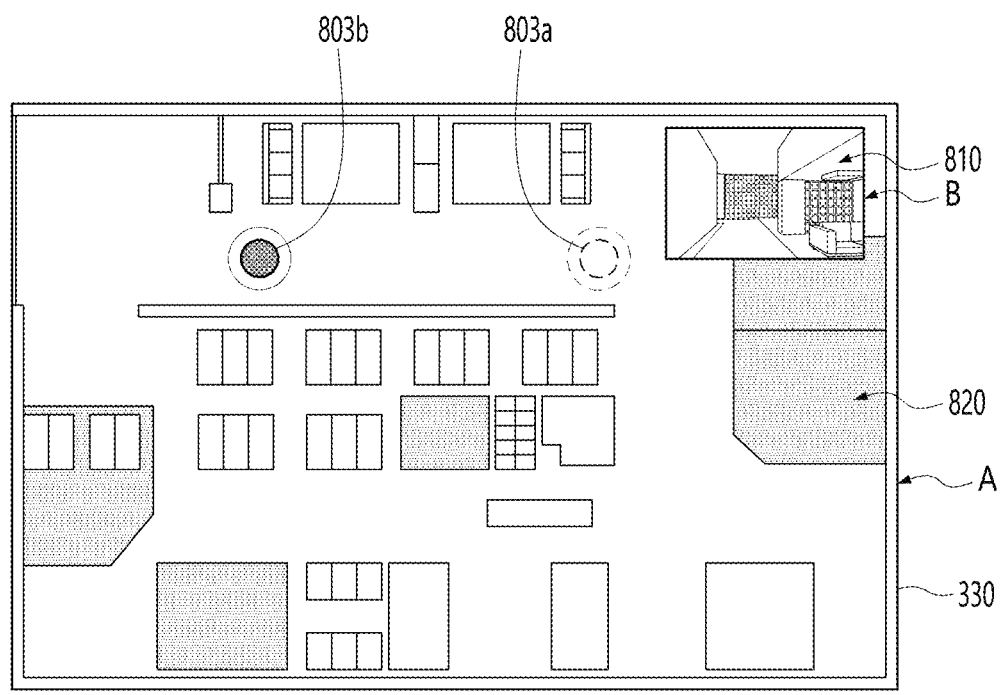

As such, when the current location of the robot 100 is changed as the robot drives according to a control command, the output position of a graphic object 803b representing the robot's current location included in the map image 820 that is output to the main area (A) may be also changed, as shown in FIG. 8D (see the output position of the graphic object: refer to reference numeral 803a). As such, when the user input is applied to the sub-area (B), the controller 350 may perform control related to the display areas (e.g., the main area (A) and the sub-area (B)) of the display unit 330, together with generation of a control command to control navigation of the robot 100. Therefore, when a screen conversion between the main area (A) and the sub-area (B) is desired while controlling the robot's navigation, the user may easily perform the screen conversion by selecting the area to which a user input is applied.

Hereinbefore, described was a method to perform a screen conversion between the main area (A) and the sub-area (B) in a state that the ambient image has been output to the main area (A). Hereinafter, will be described how to perform a screen conversion between the main area (A) and the sub-area (B) in a state that the map image has been output to the main area (A).

Figure 9A:
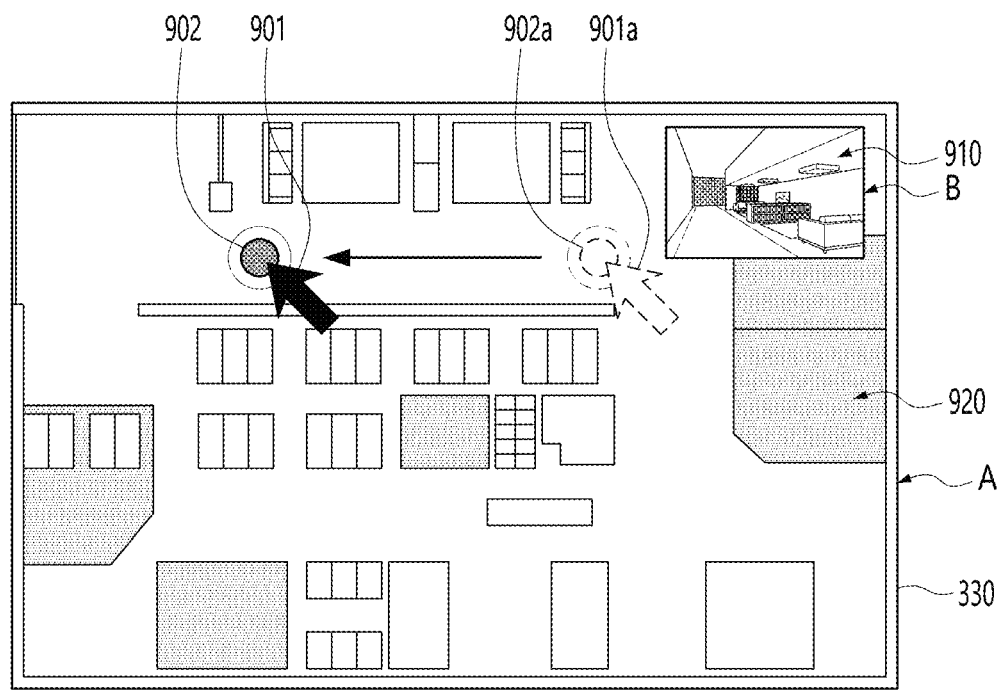
Figure 9B:
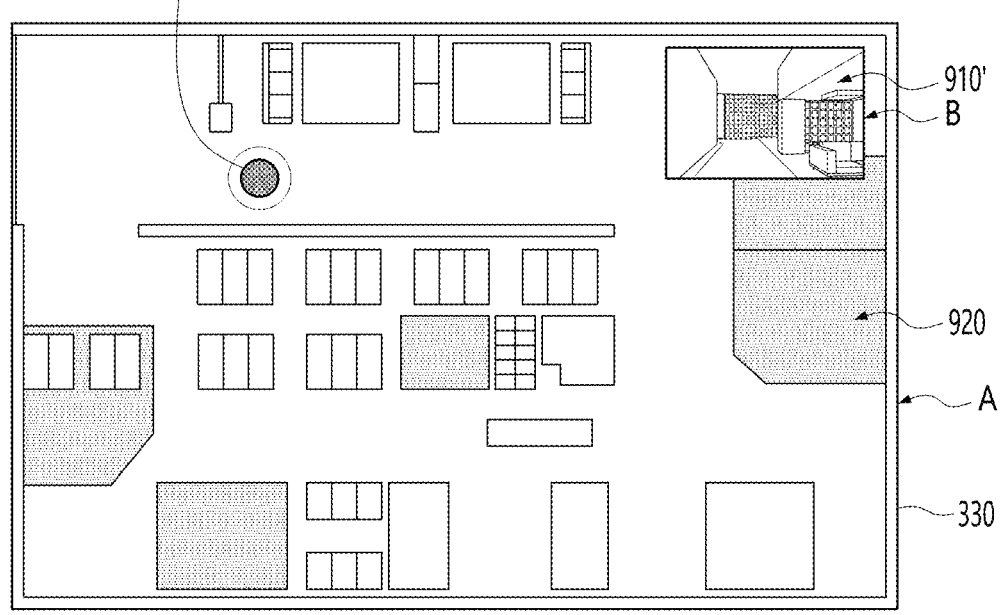

As shown in FIG. 9A, the main area (A) of the display unit 330 may output a map image 920 about a location corresponding to the location information of the robot 100, and the sub-area (B) of the display unit 330 may output an ambient image 910 captured by the robot 100. As such, while the map image 920 and the ambient image 910 are being output to the main area (A) and the sub-area (B), respectively, when a user input through the input unit 340 is applied to the main area (A), the controller 350 may generate a control command related to navigation of the robot 100 corresponding to the user input in response to the user input. For example, when the user input (e.g., a cursor movement from 901a to 901) is a control command that allows (e.g., causes) the robot 100 to drive forward in one direction (from 902a to 902), the robot 100 may drive along the one direction according to the control command. When the current location of the robot 100 is changed as the robot drives according to the control command, the output location of a graphic object (see 902, 902a of FIG. 9A) representing the robot's current location in the map image 920 that is output to the main area (A) may be also changed, as shown in FIG. 9B. Though not shown, location information contained in the map image may be changed at least partially, in conjunction with navigation of the robot 100. In other words, the controller 350 may update the map image 920 in real time or at preset or alternatively, given time intervals such that the map image 920 contains location information which is within a preset or alternatively, given range based on the robot's current location.

As shown in FIGS. 9A and 9B, the controller 350 may generate a control command to control only navigation of the robot 100 when a user input is applied to the main area (A). That is, in this case, the type of information output to the main area (A) and the sub-area (B) remains unchanged, and may be the same as or similar to that before the user input is applied.

Furthermore, as shown in FIG. 9B, an ambient image 910' output to the sub-area (B) may differ from the ambient image 910 (refer to FIG. 9A) before the robot 100 drives based on the control command. In other words, the controller 350 may receive images from the robot 100 in real time or at preset (or alternatively, given) time intervals, and output an ambient image which has been received the most recently to the sub-area (B). As described above, the user input to control navigation of the robot 100 may be a drag input applied to the display unit 330 through the input unit 340.

Figure 9C:
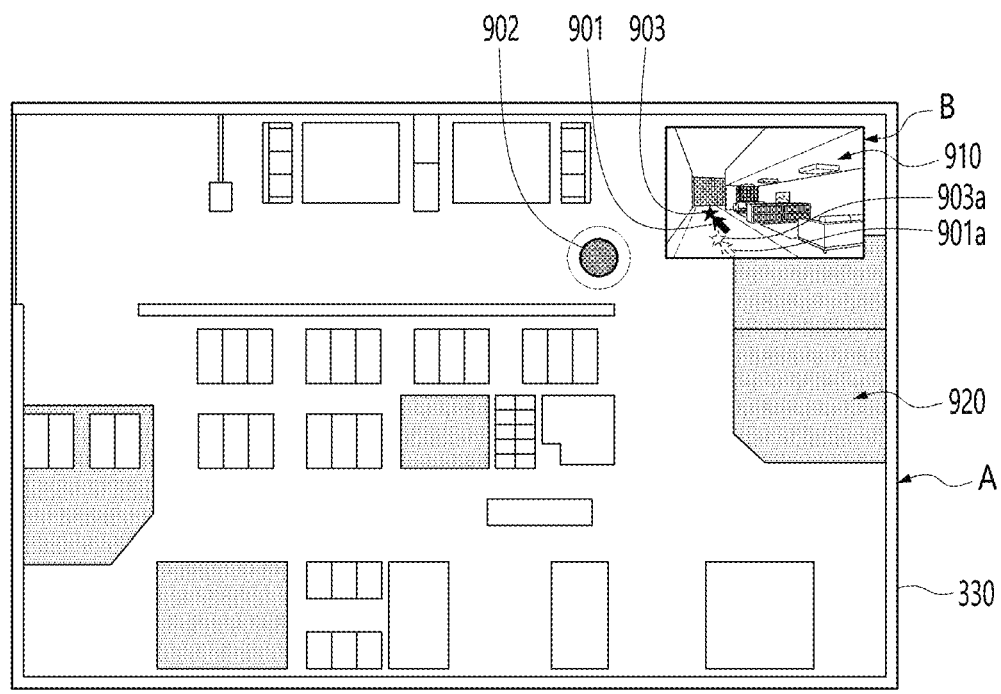

Next, will be described the opposite case to the example shown above. As shown in FIG. 9C, the main area (A) of the display unit 330 may output the map image 920 about a location corresponding to the location information of the robot 100, and the sub-area (B) of the display unit 330 may output the ambient image 910 captured by the robot 100. As such, while the map image 920 and the ambient image 910 are being output from the main area (A) and the sub-area (B), respectively, when a user input through the input unit 340 is applied to the sub-area (B), the controller 350 may generate a control command related to navigation of the robot 100 in response to the user input. For example, when the user input is a control command that allows the robot 100 to drive forward in one direction, the robot 100 may drive along the one direction according to the control command.

Figure 9D:
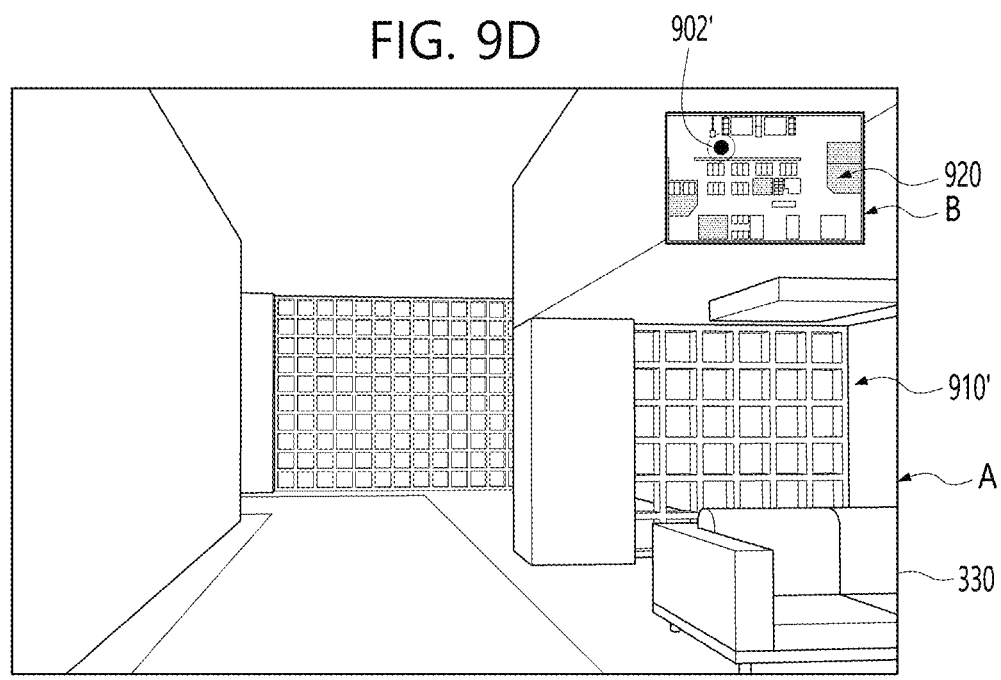

Furthermore, in response to a user input applied to the sub-area (B) as shown in FIG. 9C, the controller 350 may i) generate a control command to control navigation of the robot 100, ii) control the display unit 330 to output the ambient image 910 that was being output to the sub-area (B) to the main area (A), as shown in FIGS. 9C and 9D, and/or iii) control the display unit 330 to output the map image 920 that was being output to the main area (A) to the sub-area (B).

In other words, the controller 350 may convert visual information output to the main area (A) and the sub-area (B) when a user input is applied to the sub-area (B). As described above, the user input to control navigation of the robot 100 may be a drag input applied to the display unit 330 through the input unit 340.

The controller 350 may generate a control command to control the robot's navigation, based on a user input which drags cursor images 901*a* and 901 along one direction (from 903*a* to 903), as shown in FIG. 9C.

As such, the output position of a graphic object 902' representing the robot's current (e.g., updated) location in the map image 920 may be also changed (see the output position of the graphic object before the robot drives: refer to reference numeral 902*a*). As such, the controller 350 may perform control related to the display area (e.g., main area (A) and the sub-area (B) of the display unit 330), together with generation of a control command to control navigation of the robot 100 when a user input is applied to the sub-area (B).

Figure 10:
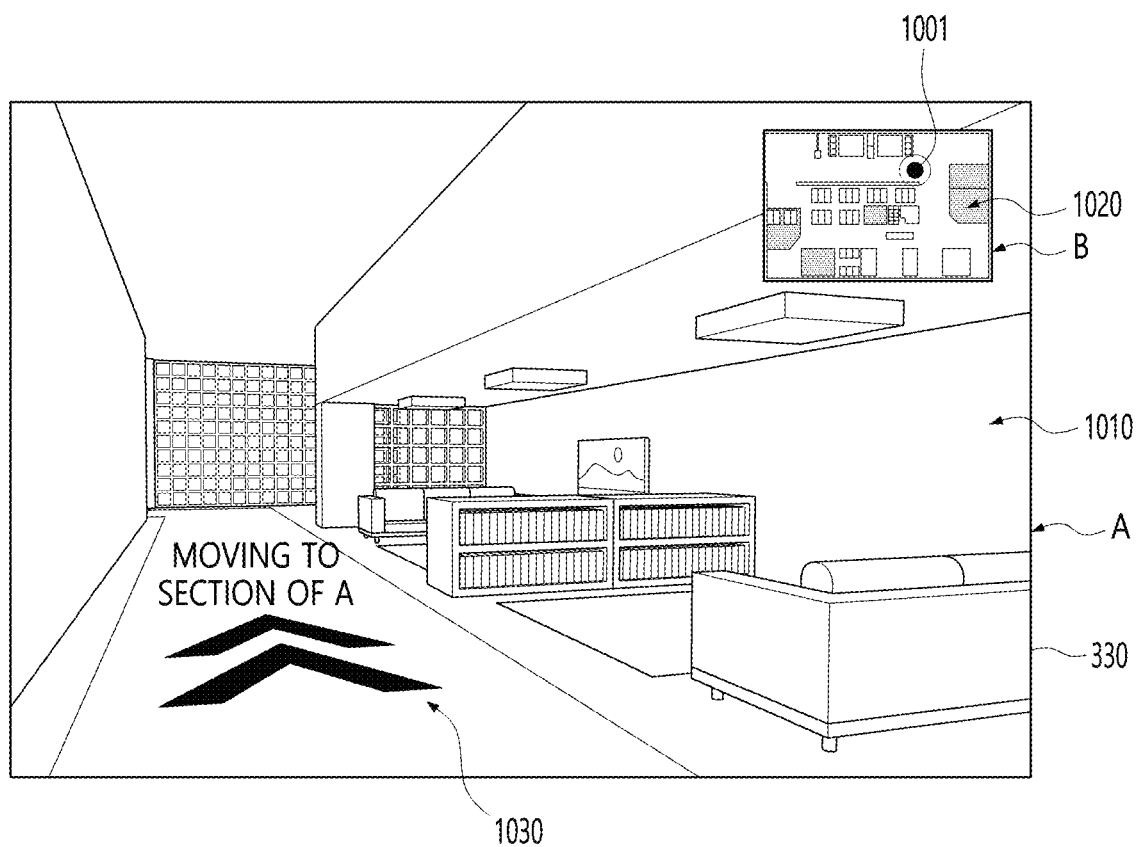

As such, in some example embodiments, control over the display unit 330 may be performed together with remote control over the robot's navigation, based on a user input to the display unit 330. The controller 350 may output guide information 1030 related to the robot's navigation to the display unit 330, as shown in FIG. 10, to provide the user with information about the robot's navigation. The guide information 1030 may vary in a visual shape based on at least one of a navigation path and/or a navigation speed of the robot. The guide information 1030 may be displayed in an overlapped state with an ambient image 1010 received from the robot, as shown. According to some example embodiments, the sub-area (B) may output the map image 1020 including the graphic object 1001 representing the robot's current location.

In contrast, the controller 350 may display the guide information 1030 on the main area (A). In this case, the main area (A) may output either the ambient image or the map image. The guide information 1030 allows the user to remotely control the robot easily.

In some example embodiments, a user input to the display unit 330 may be applied through the input unit 340. The controller 350 may perform different control commands related to navigation of the robot 100 according to attributes of the user input. In other words, navigation attributes of the robot 100 may vary according to the attributes of the user input. For example, when the user input is a drag input which drags the cursor image (e.g., refer to reference numeral 801 in FIGS. 8A and 8B) by using the input unit, the controller 350 may determine the navigation attributes of the robot based on a dragging degree and/or a dragging direction of the cursor image 801 which moves according to the user input.

Here, the navigation attributes of the robot 100 may include at least one of a navigation direction (or the robot's moving direction), a navigation speed (or the robot's moving speed), whether the robot drives or not, a navigation path, and/or a navigation distance (or the robot's moving distance).

For example, the controller 350 may control the robot's navigation speed based on a drag speed of the cursor image 801 according to the user input.

As shown in FIG. 11, the controller 350 may include matching information in which the attributes of the user input (e.g., input features, such as features of drag and/or click input types) and the navigation attributes (e.g., driving attributes) of the robot have been matched with each other. Various control commands to control the robot's navigation may be generated based on a method of the user input, an input feature, etc. The matching information shown in FIG. 11 is an example, and may be varied in some cases. For example, the user may apply various control commands about the robot's navigation by transforming various input attributes (or input features) of an input method called "drag". For example, when a drag length of the cursor image 801 is longer, the controller 350 may control a navigation distance of the robot 100 to be farther. As such, in some example embodiments, based on a user's intuitive input to the display unit 330, a screen conversion with respect to the display unit 330 may be performed together with control over the robot's navigation. This may maximize or improve user convenience for remotely controlling the robot.

In the above description, an example of estimating the location of the robot 100 by the controller 350 was explained. However, some example embodiments are not limited to this. In other words, estimation of the location of the robot 100 may be done by the robot 100 itself. In other words, the robot 100 may estimate its current position in the aforementioned way, based on images received from the robot itself 100. In addition, the robot 100 may transmit estimated location information to the controller 350. In this case, the controller 350 may perform a set of controls as seen above, based on the location information received from the robot.

Conventional devices for remote control of a robot determine a location of the robot based only on images obtained from a camera at the robot. The robot location information acquired by such conventional devices is insufficiently accurate. Accordingly, the conventional devices consume excessive resources (e.g., processor, memory, power, bandwidth, delay, etc.) in executing erroneous navigation instructions and corresponding backtracking, and cause excessive user inconvenience in attempting to remotely control the robot.

However, according to some example embodiments, improved devices and methods are provided for remote control of a robot. For example, according to some example embodiments, an image obtained from a camera at the robot may be compared with stored map images to determine the location of the robot and a corresponding map image of the location. The corresponding map image may be provided with the image from the camera on the robot to aid in the remote control of the robot. Accordingly, the improved devices and methods overcome the deficiencies of the conventional devices to reduce resource consumption (e.g., processor, memory, power, bandwidth, delay, etc.) and user inconvenience caused by erroneous navigation instructions.

According to some example embodiments, operations described herein as being performed by the robot remote control system 300, the controller 350, communication unit 310, the display unit 330, the input unit 340, the external server 200, the cloud server 210, the device of the manager, the remote control room 300*a*, the robot 100, the controller of the robot 100, the driving unit of the robot 100 and/or the communication unit of the robot 100 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

As described above, the robot remote control method and system according to some example embodiments may provide a map containing location information where the robot is located, together with images received from the robot. Through this, the robot remote control method and system according to some example embodiments may provide a user experience that may comprehensively provide environmental information surrounding the robot under remote control situations. Therefore, a user who remotely controls the robot may perform more accurate control of the robot, by considering surrounding environments when remotely controlling the robot.

Furthermore, the robot remote control method and system according to some example embodiments may provide a user experience (e.g., interface) that may perform control over the display area together as well as control over the robot based on a user input for remote control of the robot. Therefore, a user who remotely controls the robot may perform tasks more easily and intuitively according to a situation, by performing control over the robot and control over the display area with one control command.

One or more of the aforementioned operations may be executed by one or more processes in a computer, and may be implemented as a program which may be stored in a computer-readable medium.

Further, one or more of the aforementioned operations may be implemented as a computer-readable code or instruction word (e.g., a program) in a program-recorded medium.

The computer-readable medium (e.g., the storage unit 320, the database 220, etc.) may include all types of recording devices for storing data which may be read by a computer system. Examples of the computer-readable medium (e.g., the storage unit 320, the database 220, etc.) include a Hard Disk Drive (HDD), a Solid State Disk (SSD), a Silicon Disk Drive (SDD), Read-Only Memory (ROM), Random Access Memory (RAM), Compact Disk ROM (CD-ROM), a magnetic tape, a floppy disk, an optical data storage device, etc.

Further, the computer-readable medium may include a storage unit which may be a server and/or a cloud storage unit which an electronic device may access through communications. In this case, the computer may download a program of configured to implement one or more of the aforementioned operations from the server and/or the cloud storage unit, through wired and/or wireless communications.

Further, in some example embodiments, the aforementioned computer may be an electronic device where a processor, e.g., a Central Processing Unit (CPU) is mounted, and there is no limitation in a type of the computer.

The examples are not to be construed as limiting some example embodiments. The scope of some example embodiments should be determined by reasonable interpretations of the appended claims, and all changes and modifications that fall within the metes and bounds of the claims, or equivalents of such metes and bounds are therefore intended to be embraced by the appended claims.

What is claimed is:

1. A remote control method for a robot, comprising:
   outputting, by processing circuitry, both a map image and an ambient image to a display, the map image including location information corresponding to the ambient image, the ambient image being of surroundings of a robot, the ambient image being received from a camera at the robot, and a display area of the display including a main area and a sub-area;
   receiving, by the processing circuitry, a single input on the display area during the outputting;
   performing, by the processing circuitry, control operations including both controlling the display area and generating a control command for controlling the robot in response to the single input, the controlling the display including,
      switching visual information being respectively output to the main area and the sub-area in response to the single input being received on the sub-area, and
      maintaining the visual information being respectively output to the main area and the sub-area in response to the single input being received on the main area; and
   causing, by the processing circuitry, the robot to drive according to the control command by transmitting the control command to the robot.

2. The method of claim 1, wherein
   the sub-area overlaps with a part of the main area; and
   the outputting includes outputting one of the ambient image or the map image to the main area, and another one of the ambient image or the map image to the sub-area.

3. The method of claim 2, wherein the generating the control command comprises outputting the map image to the main area and the ambient image to the sub-area in response to the input being applied to the sub-area while the map image is being output to the sub-area.

4. The method of claim 1, wherein
   the map image includes a graphic object indicating the robot; and
   an output location of the graphic object on the map image corresponds to a current location of the robot.

5. The method of claim 4, further comprising:
   changing the output location of the graphic object is changed based on a changed position of the robot.

6. The method of claim 1, further comprising:
   outputting a cursor image on the display, an output location of the cursor image changing in response to the input; and
   determining navigation attributes of the robot based on a dragging degree of the cursor image and a dragging direction of the cursor image, the dragging degree of the cursor image and the dragging direction of the cursor image corresponding to a change in the output location of the cursor.

7. The method of claim 6, wherein
   the navigation attributes of the robot include at least one of a moving direction, a moving speed, or a moving distance of the robot; and
   the determining navigation attributes of the robot determines the moving speed of the robot based on a drag speed of the cursor image, the drag speed of the cursor image corresponding to a change in the output location of the cursor.

8. The method of claim 1, wherein
   the map image is a first portion of a map image of a space, the map image of the space having a plurality of portions; and
   the method further comprises determining the first portion from among the plurality of portions based on the ambient image.

9. The method of claim 8, wherein the determining the first portion from among the plurality of portions comprises determining a similarity between the first portion and the ambient image.

10. A robot remote control system, comprising:
a display having a display area, the display area including a main area and a sub-area;
a communication unit configured to receive an ambient image from a camera provided at a robot, the ambient image being of surroundings of the robot; and
a controller configured to,
control the display to output both a map image and the ambient image, the map image including location information corresponding to the ambient image,
receive a single input on the display area during the outputting,
perform control operations including both controlling the display area and generating a control command for controlling the robot in response to the single input, the controlling the display including,
switching visual information being respectively output to the main area and the sub-area in response to the single input being received on the sub-area, and
maintaining the visual information being respectfully output to the main area and the sub-area in response to the single input being received on the main area, and
cause the robot to drive according to the control command by controlling the communication unit to transmit the control command to the robot.

11. The robot remote control system of claim 10, wherein the sub-area overlaps with a part of the main area; and
the controller is configured to control the display to output one of the ambient image or the map image to the main area, and another one of the ambient image or the map image to the sub-area.

12. The robot remote control system of claim 11, wherein the controller is configured to generate the control command including outputting the map image to the main area and the ambient image to the sub-area in response to the input being applied to the sub-area while the map image is being output to the sub-area.

13. The robot remote control system of claim 10, wherein the map image includes a graphic object indicating the robot; and
an output location of the graphic object on the map image corresponds to a current location of the robot.

14. The robot remote control system of claim 13, wherein the controller is configured to control the display to change the output location of the graphic object based on a changed position of the robot.

15. The robot remote control system of claim 10, wherein the controller is configured to:
control the display to output a cursor image, an output location of the cursor image changing in response to the input; and
determine navigation attributes of the robot based on a dragging degree of the cursor image and a dragging direction of the cursor image, the dragging degree of the cursor image and the dragging direction of the cursor image corresponding to a change in the output location of the cursor.

16. The robot remote control system of claim 15, wherein the navigation attributes of the robot include at least one of a moving direction, a moving speed, or a moving distance of the robot; and
the controller is configured to determine the moving speed of the robot based on a drag speed of the cursor image, the drag speed of the cursor image corresponding to a change in the output location of the cursor.

17. The robot remote control system of claim 10, wherein the map image is a first portion of a map image of a space, the map image of the space having a plurality of portions; and
the controller is configured to determine the first portion from among the plurality of portions based on the ambient image.

18. The robot remote control system of claim 17, wherein the controller is configured to determine the first portion from among the plurality of portions by determining a similarity between the first portion and the ambient image.

19. A non-transitory computer-readable medium storing instructions that, when executed by at least one processor, cause the at least one processor to perform a remote control method for a robot, the method comprising:
outputting, by the at least one processor, both a map image and an ambient image to a display, the map image including location information corresponding to the ambient image, the ambient image being of surroundings of a robot, the ambient image being received from a camera at the robot, and a display area of the display including a main area and a sub-area;
receiving, by the at least one processor, a single input on the display area during the outputting;
performing, by the at least one processor, control operations including both controlling the display area and generating a control command for controlling the robot in response to the single input, the controlling the display including,
switching visual information being respectively output to the main area and the sub-area in response to the single input being received on the sub-area, and
maintaining the visual information being respectively output to the main area and the sub-area in response to the single input being received on the main area; and
causing, by the at least one processor, the robot to drive according to the control command by transmitting the control command to the robot.

20. The non-transitory computer-readable medium of claim 19, wherein
the map image is a first portion of a map image of a space, the map image of the space having a plurality of portions; and
the method further comprises determining the first portion from among the plurality of portions based on the ambient image.

* * * * *